June 29, 1948. W. A. KOSTICK Re. 23,011

DUMPING TRUCK LIFT

Original Filed April 26, 1940 3 Sheets-Sheet 1

Inventor

WALTER A. KOSTICK

By F. O. Whiteley Attorney

June 29, 1948. W. A. KOSTICK Re. 23,011

DUMPING TRUCK LIFT

Original Filed April 26, 1940 3 Sheets-Sheet 2

Inventor
WALTER A. KOSTICK
By R. A. Whiteley
Attorney

June 29, 1948. W. A. KOSTICK Re. 23,011

DUMPING TRUCK LIFT

Original Filed April 26, 1940 3 Sheets-Sheet 3

Inventor
WALTER A. KOSTICK
By R. A. Whiteley
Attorney

Reissued June 29, 1948

Re. 23,011

UNITED STATES PATENT OFFICE 23,011

DUMPING TRUCK LIFT

Walter A. Kostick, Minneapolis, Minn.

Original No. 2,283,857, dated May 19, 1942, Serial No. 331,794, April 26, 1940. Application for reissue November 23, 1942, Serial No. 466,695

11 Claims. (Cl. 214—46.5)

My invention relates to a dumping truck lift and has for its object to provide and does provide an improved and highly efficient so-called dumping truck lift and, generally stated, consists of the novel devices, combinations of devices, and arrangement of parts hereinafter described and defined in the claims.

Particularly this invention relates to scale platforms that have supplemental sections or lifting platforms combined with cylinder-and-piston motors for lifting the latter. These cylinder and piston motors consist of a cylinder rigidly supported at its upper end from an open-ended bearing member, and having therein an open-ended sleeve in which is located a hollow piston rod with closed ends, compressed air introduced beneath the closed end of the piston rod causing the rod to rise within the sleeve until complementary members engage, when the sleeve will be picked up and moved with the rod, thus giving a telescoping extension which greatly reduces the depth of the pit below the lifting apparatus.

Still more specifically stated, the invention relates especially to scale platforms of the type just above outlined and wherein the cylinder and co-operating parts are located below and hung from the scale platform, so that all of such parts are carried as a part of the normal weight on the scale mechanism.

Hitherto dumping platform mechanism and actuating motors, arranged as above indicated, have been manufactured and extensively used, in an arrangement wherein the cylinder of the lifting motor was rigidly secured to and not capable of oscillatory movements in respect to the scale platform; but that arrangement has not been found completely satisfactory because certain actions take place in actual usage and which may be briefly stated as follows: When a dumping truck is driven onto the scale platform, with its front wheels on the lifting platform, and the latter is then elevated, the weight on the rear wheels of the truck will tend to hold the rear truck wheels against forward travel. Under the lifting action the front wheels will be moved on the arc of a circle struck from the axis of the rear wheels, and this produces a backward pull on the lifting platform which is transmitted to the piston and produces an intense strain between the cylinder and the piston.

If the truck is one that has brakes and these brakes be set (and the brakes should be set), then the rearward pull on the lifting platform will be further increased. In either event, as the lifting platform is elevated and a lesser portion of the piston is within the cylinder, then this cramping action between the cylinder and piston will progressively increase with the result that terrific wear and sometimes breakage of the parts has been produced.

In accordance with my invention, I overcome the above noted objectionable actions by pivotally hanging the cylinder of the lifting motor on the scale platform structure, by means of an open-ended rigid bearing member pivotally connected with the platform structure, so that in the lifting action under rearward pull on the lifting platform, the entire cylinder and multi-section tubular piston motor and the lifting platform will rock this pivoted bearing cylinder support. This feature, broadly stated, is, in practice, carried out in a novel way and involves various additional novel features, all of which will appear in the detailed description and the drawings.

To avoid the necessity of a very deep pit below the scale platform and the scale mechanism, I use with the pivotal cylinder support a relatively short cylinder and a multi-section piston. A vertically movable horse guard is desirable in a mechanism of this kind and I have been able to use a horse guard of the desired vertical length without making the pit deeper than required for the cylinder of the motor, and to do this, I have devised a novel means for operating the same, in which the horse guard is not picked up and carried with the lifting platform and piston until the piston has been given a considerable initial upward movement.

The invention embodying the novel features above briefly outlined and various other highly important novel features is illustrated in the accompanying drawings wherein like characters indicate like parts throughout the several views.

Referring to the drawings.

Figure 1:
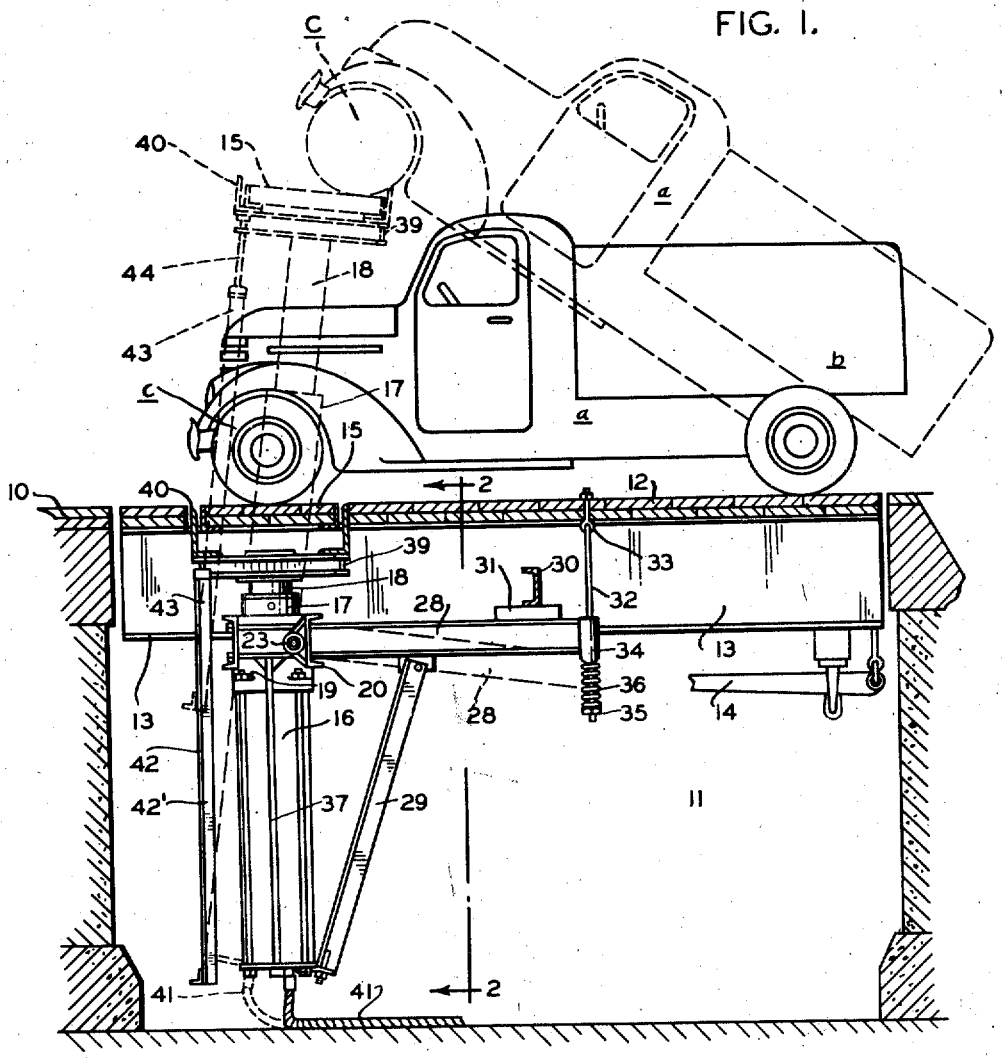
Fig. 1 is a view chiefly in side elevation, with some parts sectioned, illustrating the improved dump and showing a dumping truck thereon.

In the drawings I have conventionally shown a fixed driving platform 10 having the customary opening for the scale mechanism and below the same a pit 11. The scale platform 12 is directly supported on metallic main beams 13 which, through scale levers 14 or the like, are carried by scale mechanism of well-known or any suitable type. Near its front end there is formed transversely across the scale platform an opening. Seated within this opening, and, when in its lowered position, having its upper face approximately flush with or in the horizontal plane of the top face of the scale platform 12, is located a lifting platform 15 which constitutes a supplemental part of the complete scale platform adapted to act as a support for raising the forward end of a vehicle by contacting the front wheels thereof. This lifting platform 15 is supported by the main beams 13 in the same manner that these beams support the rest of the scale platform, by engagement of the ends of lifting platform 15 with the tops of main beams 13.

Figure 2:
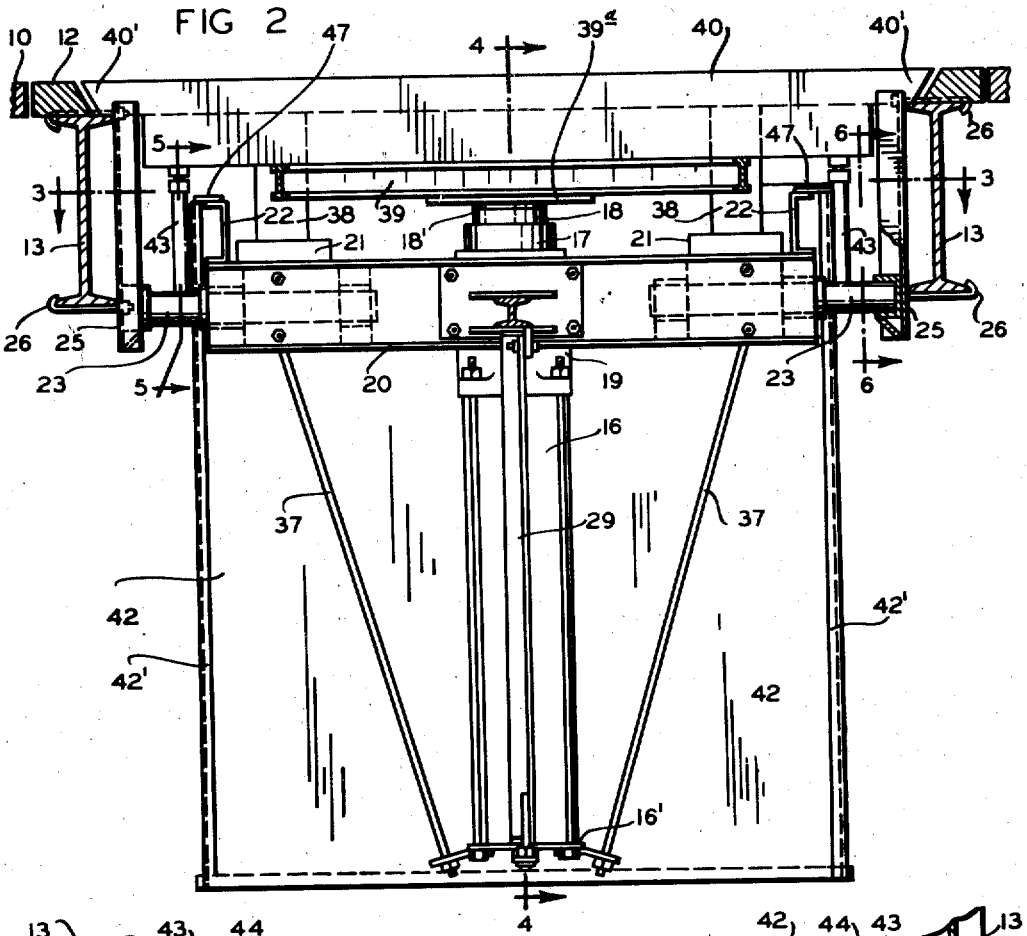
Fig. 2 is a vertical section taken approximately on the line 2—2 of Fig. 1.
Figure 3:
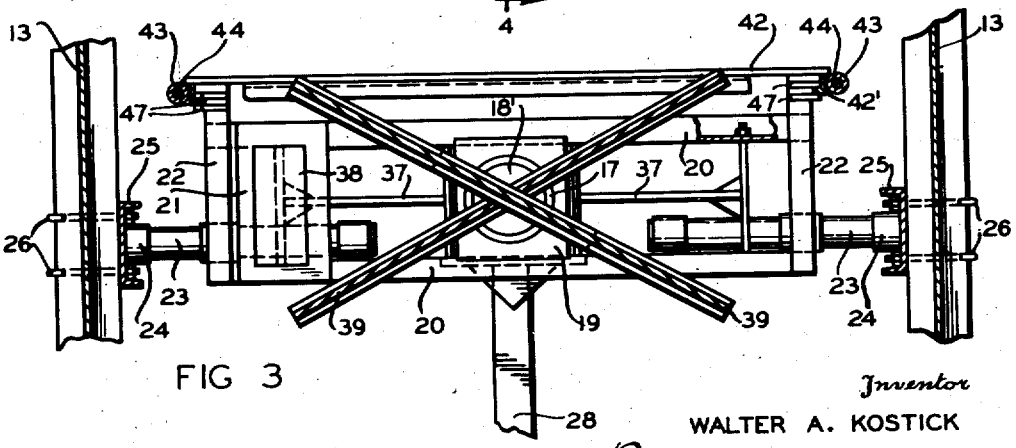
Fig. 3 is a horizontal section taken approximately on the line 3—3 of Fig. 2, some parts being broken away.
Figure 6:
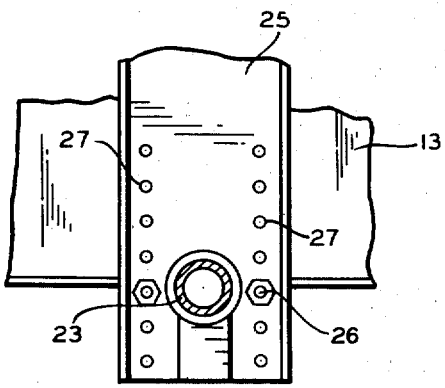
Fig. 6 is a fragmentary section taken on the line 6—6 of Fig. 2.

The cylinder and piston motor, which I have illustrated and which is very advantageously used, is made up of a cylinder 16 and a multisection tubular piston 17—18. The outer piston section 17 is in the form of an open-ended tube or sleeve, which is adapted to slide in a floating manner within the depending cylinder for predetermined distances up and down. The inner piston section 18, though hollow or cylindrical, is closed at both ends, the lower end forming the piston face proper, to be acted upon by the compressed air, and the upper end carrying a head on which the supplemental platform or lifting platform is mounted for elevating the front end of the truck as the multi-section piston 17—18 by air pressure is projected upwardly. Open-ended tube or piston section 17 works directly in the cylinder 16 and the piston section 18 works directly in the section 17. The cylinder 16 depends from an open-ended bearing portion 19, Fig. 4, having a cylindrical inner surface and being flanged at its upper end and bolted or otherwise rigidly secured to transverse metallic channel beams 20 which, at their ends, are bolted or otherwise rigidly secured to spacing blocks 21; see particularly Fig. 3. The extended ends of the cross beams 20 are further connected by tie-bars or beams 22, see Figs. 3 and 7, which, as shown, are channel-shaped in cross section. Rigidly secured to the blocks 21, to the tie-beams 22, and to one of the cross beams 20, are heavy cylinder supporting trunnions 23, the ends of which, as best shown in Figs. 2, 3 and 6, are journaled in bearing hubs 24 that are a part of or, at any rate, rigidly secured to the lower ends of hanger brackets 25 which, as shown, are heavy channel beams. These hanger brackets 25 are rigidly secured to the main scale platform beams 13 by suitable means, preferably by nut-equipped hook bolts 26, passed through bolt holes 27, and said brackets 25 with the hooked ends of the bolts clinched over the flanges of the respective beams 13. A plurality of vertically spaced bolt holes 27 afford means for vertically adjusting the trunnions 23, and hence, the entire lifting motor.

The cylinder 16, by the means just described, is mounted for oscillatory movements in the vertical medial longitudinal plane of the scale platform 12. To limit the oscillatory movement of the cylinder, and hence of the entire cylinder and piston motor, the cylinder is shown as provided with a long rearwardly projecting arm 28 that projects rearwardly from the upper portion of the cylinder and is further connected to the lower portion of the cylinder by an oblique truss-bar 29. Here it should be noted that the axis of the pivot afforded by the trunnions 23 and hubs 24 is somewhat forward of the axis of the cylinder so that there will be a somewhat preponderance of weight on the front side of the trunnions which will tend to throw the arm 28 upward. To limit the upward movement of the arm 28 to a position in which the cylinder 16 will be in a vertical position, a transverse stop bar 30 is secured to and extended between the main scale beams 13, see particularly Fig. 1.

Preferably the beam 30 is provided with a cushion block 31 of wood or other suitable material with which the arm 28 is normally engaged.

To limit the downward movement of the arm 28, and hence the rocking movement of the cylinder and piston from full line positions in Fig. 1, into oblique positions indicated by dotted lines in said view, various kinds of stop devices may be employed, but for this purpose I have shown a stop rod 32 pivotally anchored to the scale platform 12 by an eye-bolt 33 and at its lower end working freely through a sleeve-like head 34 at the free end of said arm 28. At its extreme lower end the rod 32 is shown as provided with a nut 35 or the like between which and the free end of the arm 28 is a coiled spring 36.

As best shown in Fig. 2, the cylinder 16, at its lower end, is provided with a head 16′ and the cylinder is braced against lateral swinging movements by guy-rods 37, the lower ends of which are attached to projections of said head 16′, and the upper ends of which are anchored to the cross beams 20.

Normally, or when the piston of the lifting motor is contacted or lowered to its extreme position, the lifting platform section 15 will rest upon extensions 38 of the blocks 21 and will be solely supported thereby.

The piston member 18, at its upper end, carries an expanded frame or piston head-forming portion which, as shown, includes transversely crossed I-beams 39 which, in turn, are welded or otherwise rigidly secured to a pair of parallel wheel-stop flanges 40, shown as in the form of angle bars. The I-beams 39, in this preferred structure, are welded or otherwise rigidly secured to a metal plate 39a that has a rigidly attached heavy trunnion 18′ that is telescoped into the upper end of the piston member 18. By this arrangement the inner piston member 18 is provided with a detachable head or cage-like lifting structure.

Figure 4:
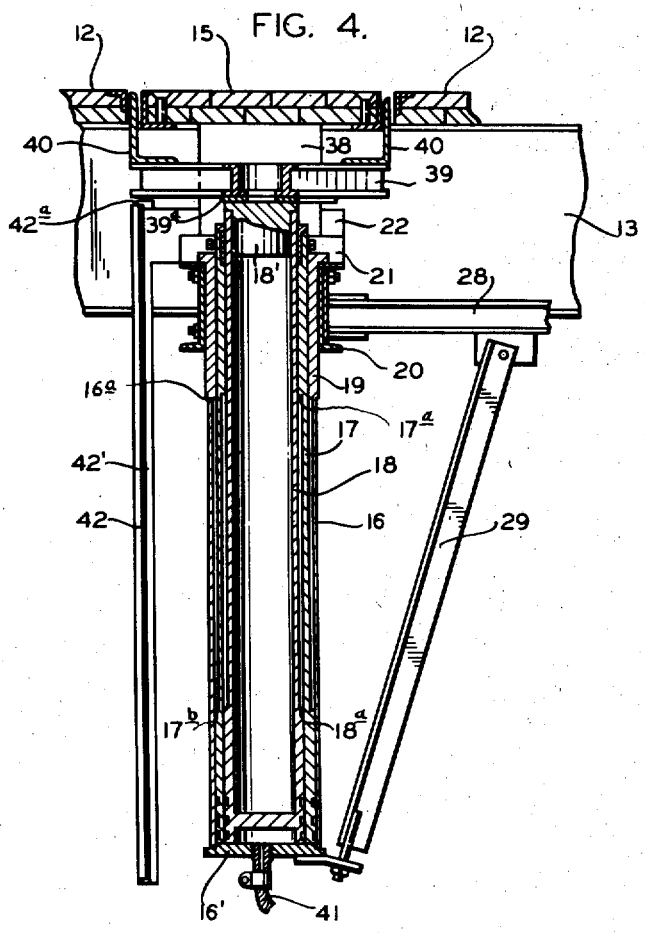
Fig. 4 is a vertical section taken on the line 4—4 of Fig. 2.

The beams 39 are normally considerably below and out of contact with the lifting platform 15, as best shown in Figs. 1, 2 and 4, and the stop flanges 40 will be below the level of the platform structure. To limit the extreme downward movement of this cage-like head, and hence, of the piston section 18, the flanges 40, at their ends, have projections 40′ that normally rest upon the upper flanges of the main scale beams 13 and limit the downward movement of said head to the normal position best shown in Figs. 2 and 4. In said normal position the head is below and entirely out of engagement with the lifting platform 15.

In this invention the use of a multi-section piston is important for reasons already indicated, but it will be understood that the details of construction of such multi-section piston motor may be varied in many ways.

The horse guard is preferably a sheet metal plate 42 reinforced at its edges by light angle bars 42'. To the upper end portions of the angle bars 42' are welded or otherwise rigidly secured cylinder-like sleeves 43 in which work telescopically lifting rods or plungers 44, the upper ends of which are rigidly secured to the lower angles of the stop flanges 40, see particularly Figs. 1 and 5. At their lower ends the lifting rods 44 have heads 45, which, when raised, engage caps 46 applied to the upper ends of the sleeve ends of the sleeve 43 and through which the rods 44 work telescopically. The flanges of the angle bars 42', at the edges of the horse guard 42, slide freely between laterally spaced guide pins 47 welded or otherwise secured to the forwardly projecting ends of the tie-beams 22, see particularly Figs. 3 and 7.

In Fig. 1, wherein the dumping truck is shown, the character *a* indicates the body, the character *b* the rear wheels, and the character *c* the front wheels thereof.

Figure 7:
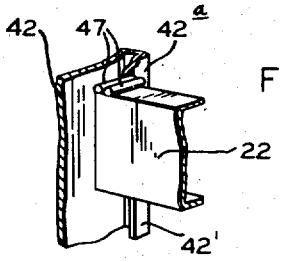
Fig. 7 is a fragmentary view in perspective showing a portion of the horse guard and guide therefore.

By reference particularly to Figs. 4 and 7, it will be noted that the angle bars 42' of the horse guard 42 are provided with projecting stop lugs or lips 42*a* that normally rest on the stop flange of the beam 22 and limit the downward movement of said horse guard.

Also, it will be noted that the inner cylindrical piston 18 has an annular external shoulder 18*a* that is engageable with an annular internal shoulder 17*a* on the cylindrical piston section 17, and that said piston section 17 has an external annular shoulder 17*b* that is engageable with an internal annular shoulder 16*a* on the cylinder 16. These shoulders cause the inner cylindrical piston 18 to pick up the cylindrical piston 17 so that the said piston sections will be extended in the order named. Also, the shoulder 17*b*, when engaged with the shoulder 16*a*, will limit the extreme expansion or upward movement of the piston.

*Operation*

Assuming that the dumping truck or vehicle is driven on the scale platform 12 with its front wheels on the lifting platform 15 and that air or other motive fluid is introduced into the cylinder, the dump-producing operation will be as follows:

Following the introduction of compressed air the inner piston 18 will be moved upwardly. This initial upward movement will first cause the stop flanges 40 to project above the lifting platform 15 to prevent the wheels from running off the said platform. Further upward movement of the piston will cause the cage-like head to engage the lifting platform 15, which is then mounted upon the upward end of the inner piston section 18. Continued upper movement of the inner piston section 18 will bring its annular external shoulder 18*a* into engagement with the annular internal shoulder 17*a* on the outer piston section 17, which will cause the outer piston section 17 to rise with the inner piston section 18 until the shoulder 17*b* engages the shoulder 16*a* on the cylinder 16 which will stop upward movement. After the cage-like head has been moved above the scale platform 12, the rearward pull on the platform 15 and the piston head will cause the cylinder 16 and the parts carried by the lifting platform to rock on the pivot 23, as indicated by dotted lines in Fig. 1. This rocking action entirely relieves all lateral strain between the cylinder and piston structure and prevents the truck from being drawn forward on its rear wheels. Under the above rocking movement of the cylinder and piston structure, arm 28 will be moved downward, as indicated by dotted lines in Fig. 1, against the tension of spring 36. In fact, the tension of the spring 36 is not such as to exert any considerable force tending to prevent rocking movement of the cylinder. The spring 36 might, in fact, be eliminated or made very short so as to simply act as a cushion at the limit of the downward movement of the arm 28 against the stop nut 35 or equivalent stop device. In fact, in some cases the stop mechanism for limiting the downward movement of the arm 28 might be omitted.

By reference particularly to Fig. 1, it will be noted that the pivot 23, that supports the cylinder 16, is far below the scale platform 12 and that the said cylinder can not oscillate until the piston has been raised far enough to pick up the lifting platform 15 and carry the same and the flanges 40 well above the scale platform. This is important because the weight of arm 28 tends to produce the oscillation of the cylinder and furthermore in the lifting of the front end of the truck, and especially if the rear wheels be set, there is a further tendency to pull the lifting platform and piston backward. This rearward tilting movement of the piston and head and the oscillation of the cylinder will, of course, take place as soon as the lifting platform and the head of the piston are raised above the scale platform.

Figure 5:
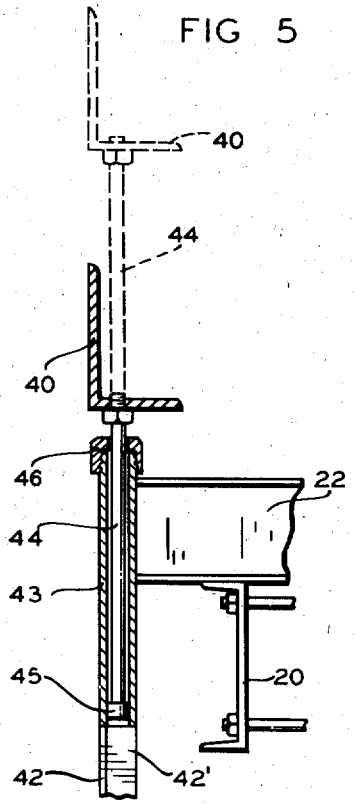
Fig. 5 is a fragmentary section taken on the line 5—5 of Fig. 2.

For a considerable part of the upward movement of the piston, cage-like head and lifting platform 15, the horse guard will not be raised, but when the heads 45 of plungers 44 engage the caps 46 of the sleeves 43, as indicated by dotted lines in Fig. 5, then and thereafter under upward movement of the piston, cage-like head and lifting platform 15, the horse guard will be raised.

Obviously, when air is let out of the cylinder under proper control, the piston, lifting platform, and horse guard will, under an action reversed from that above described, be lowered and restored to normal positions. As already indicated, the horse guard will be limited in its downward movement to a position in which the lugs 42*a* engage the upper flanges of the beam 22. The above manner of lifting the horse guard and restoring it to normal position makes possible the use of a horse guard of the proper vertical length without bringing the horse guard into contact with the bottom of the pit or requiring a deeper pit therefor.

The manner in which a load will be dumped from the truck is too well understood to require further comments. Usually there will be a pit adjacent to or sometimes partly under the scale platform, but that is a structure hitherto employed and not necessary for the purpose of this case to consider.

In accordance with the patent statutes I have described what is at present believed to be a preferred embodiment of the invention, but it will be understood that the structure illustrated in the drawings and specifically described is capable of a large range of modification all within the scope of the invention herein disclosed and desired to be broadly claimed.

I claim:

1. The combination with a platform structure having an opening therein, and a lifting platform in said opening and normally seated to have its top flush with the top of said platform structure, of a lifting motor involving a cylinder and piston located immediately below said lifting platform, the cylinder thereof being pivotally supported from said platform structure, a cage-like head applied to the upper end of the piston of said motor and when out of operation, being positioned below and out of supporting contact with said lifting platform, said lifting head having flanges that embrace said lifting platform and work through said opening and prevent oscillation of said cylinder and piston until said head has engaged said lifting platform and moved to a point above said platform thereafter permitting oscillation of said motor.

2. The structure defined in claim 1 in further combination with a stop device limiting the oscillatory movement of the cylinder and piston against movement in one direction from vertical position but permitting oscillation thereof when said lifting head is raised as stated.

3. The structure defined in claim 1 in which said cylinder is provided with a rigidly secured arm projecting laterally therefrom, and a stop device on the platform structure limiting the upward movement of said arm but permitting the said arm to lower to produce oscillation of said cylinder and piston.

4. The combination with a platform having a supplemental section forming a lifting platform normally seated therein with its top surface in the plane of the top surface of the platform but capable of being bodily raised away from and above the same, of a cylinder and piston lifting motor, said cylinder being pivotally hung from said platform structure, the piston of said motor having a head operative to lift said supplemental section and permit the same and said motor to oscillate, said cylinder having a rigidly secured laterally projecting arm, a stop on said platform structure limiting the upward movement of said arm but permitting downward movement thereof.

5. The combination with a platform having a supplemental section forming a lifting platform normally seated therein with its top surface in the plane of the top surface of the platform but capable of being bodily raised away from and above the same, of a cylinder and piston lifting motor, said cylinder being pivotally hung from said platform structure, the piston of said motor having a head operative to lift said supplemental section and permit the same and said motor to oscillate, said cylinder having a rigidly secured laterally projecting arm, a stop on said platform structure limiting the upward movement of said arm but permitting downward movement thereof, and yielding means tending to hold said arm engaged with said stop.

6. The combination with a platform having a supplemental section forming a lifting platform which when out of operation is seated with its top surface in the plane of the top surface of the platform but capable of being bodily raised away from and above the same, of a cylinder and piston lifting motor, said cylinder being pivotally hung from said platform structure, the piston of said motor having a head operative to lift said supplemental section and permit the same and said motor to oscillate, said cylinder having a rigidly secured laterally projecting arm, a stop on said platform structure limiting the upward movement of said arm but permitting downward movement thereof and yielding means tending to hold said arm engaged with said stop, and a stop rod hung from said platform structure and having a stop thereon limiting the downward movement of said arm.

7. The structure defined in claim 6 in which a coiled spring is interposed on said rod between said arm and the stop on said depending rod.

8. The structure defined in claim 4 in which the pivotal connection between said cylinder and platform structure is offset from the axis of said cylinder in a direction toward which said arm projects from the cylinder.

9. In a grain dump, a pneumatic air actuated hoist, said hoist embodying an upwardly directed open-ended bearing, a cylinder secured to and depending from said bearing, means mounting said bearing to permit oscillation thereof and of the depending cylinder, a sleeve open at both ends floatingly telescoped within said cylinder, a piston with a piston rod mounted to slide telescopically within said sleeve, said sleeve and piston rod adapted to slide when the cylinder is in any of its oscillated positions, and a wheel-receiving platform mounted on said rod for hoisting front ends of vehicles.

10. In a grain dump, a pneumatic air actuated hoist, said hoist embodying an upwardly directed open-ended bearing, a cylinder secured to and depending from said bearing, supporting means for said bearing including pivots offset from the axial center thereof to permit oscillation thereof and of the depending cylinder, a sleeve open at both ends floatingly telescoped within said cylinder, a piston with a piston rod mounted to slide telescopically within said sleeve, said sleeve and piston rod adapted to slide when the cylinder is in any of its oscillated positions, and a wheel-receiving platform mounted on said rod when the same is in operation for hoisting front ends of vehicle.

11. In a grain dump, a pneumatic air actuated hoist, said hoist embodying an upwardly directed open-ended bearing, a cylinder secured to and depending from said bearing, means mounting said bearing to permit oscillation thereof and of the depending cylinder, a sleeve open at both ends floatingly telescoped within said cylinder, a piston with a piston rod mounted to slide telescopically within said sleeve, external means on the lower part of the piston rod and internal means on the upper part of the sleeve for causing them to move together after the piston rod has been moved a predetermined distance, external means on the lower part of the sleeve and internal means on the upper part of the cylinder to stop movement of the sleeve and piston rod when said movement has reached a predetermined extent, and a wheel-receiving platform mounted on said rod for hoisting front ends of vehicles.

WALTER A. KOSTICK.

REFERENCES CITED

The following references are of record in the file of this patent:

UNITED STATES PATENTS

| Number | Name | Date |
|---|---|---|
| 1,973,014 | Oglesby | Sept. 11, 1934 |
| 2,253,004 | Winter | Aug. 19, 1941 |
| 2,294,531 | Winter et al. | Sept. 1, 1942 |